United States Patent
Hu et al.

(10) Patent No.: US 11,741,372 B2
(45) Date of Patent: Aug. 29, 2023

(54) PREDICTION-CORRECTION APPROACH TO ZERO SHOT LEARNING

(71) Applicant: salesforce.com, inc., San Francisco, CA (US)

(72) Inventors: Lily Hu, San Francisco, CA (US); Caiming Xiong, San Francisco, CA (US); Richard Socher, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 59 days.

(21) Appl. No.: 17/397,677

(22) Filed: Aug. 9, 2021

(65) Prior Publication Data

US 2021/0365740 A1 Nov. 25, 2021

Related U.S. Application Data

(63) Continuation of application No. 16/176,075, filed on Oct. 31, 2018, now Pat. No. 11,087,177.

(Continued)

(51) Int. Cl.
*G06F 16/906* (2019.01)
*G06N 3/088* (2023.01)
(Continued)

(52) U.S. Cl.
CPC .............. *G06N 3/088* (2013.01); *G06F 16/55* (2019.01); *G06F 16/906* (2019.01);
(Continued)

(58) Field of Classification Search
CPC ........ G06N 20/00; G06N 3/0454; G06N 3/08; G06N 20/20; G06N 3/045; G06K 9/6218;
(Continued)

(56) References Cited

U.S. PATENT DOCUMENTS 10,043,112 B2 * 8/2018 Talathi ................... G06V 10/82
10,043,261 B2 8/2018 Bhaskar et al.
(Continued)

OTHER PUBLICATIONS

Akata et al., "Label-Embedding for Attribute-Based Classification," In IEEE Conference on Computer Vision and Pattern Recognition, Portland, Oregon. Jun. 25-27, 2013. pp. 819-826.
(Continued)

*Primary Examiner* — Matthew C Bella
*Assistant Examiner* — Dennis Rosario
(74) *Attorney, Agent, or Firm* — Haynes and Boone, LLP

(57) ABSTRACT

Approaches to zero-shot learning include partitioning training data into first and second sets according to classes assigned to the training data, training a prediction module based on the first set to predict a cluster center based on a class label, training a correction module based on the second set and each of the class labels in the first set to generate a correction to a cluster center predicted by the prediction module, presenting a new class label for a new class to the prediction module to predict a new cluster center, presenting the new class label, the predicted new cluster center, and each of the class labels in the first set to the correction module to generate a correction for the predicted new cluster center, augmenting a classifier based on the corrected cluster center for the new class, and classifying input data into the new class using the classifier.

20 Claims, 6 Drawing Sheets

Related U.S. Application Data

(60) Provisional application No. 62/737,805, filed on Sep. 27, 2018.

(51) Int. Cl.

| | | |
|---|---|---|
| *G06N 3/08* | (2023.01) | |
| *G06F 18/21* | (2023.01) | |
| *G06F 18/2413* | (2023.01) | |
| *G06V 10/764* | (2022.01) | |
| *G06V 10/776* | (2022.01) | |
| *G06V 10/80* | (2022.01) | |
| *G06V 10/82* | (2022.01) | |
| *G06F 16/55* | (2019.01) | |

(52) U.S. Cl.
CPC ...... *G06F 18/217* (2023.01); *G06F 18/24137* (2023.01); *G06N 3/08* (2013.01); *G06V 10/764* (2022.01); *G06V 10/776* (2022.01); *G06V 10/811* (2022.01); *G06V 10/82* (2022.01)

(58) Field of Classification Search
CPC .. G06K 9/6267; G06K 9/6215; G06K 9/6223; G06K 9/00536; G06V 10/82; G06V 40/172; G06V 30/19173; G06V 10/765; G06V 10/764; G06F 40/30; G06F 16/285; G06F 16/35; G06F 16/353; G06F 16/355; G06F 18/214; G06F 18/24; G06F 18/25; G06F 18/254; G06F 16/55; G06F 16/906; G06F 18/23213; G06F 18/241; G06T 2207/20081; G06T 2207/20084
See application file for complete search history.

(56) References Cited

U.S. PATENT DOCUMENTS

| | | | |
|---|---|---|---|
| 10,282,663 B2 | 5/2019 | Socher et al. | |
| 10,346,721 B2 | 7/2019 | Albright et al. | |
| 10,482,313 B2 | 11/2019 | Murthy et al. | |
| 10,503,775 B1 | 12/2019 | Ranzinger et al. | |
| 11,087,177 B2 * | 8/2021 | Hu | G06V 10/82 |
| 2011/0249905 A1 * | 10/2011 | Singh | G06V 30/412 |
| | | | 382/225 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2018/0082171 A1 | 3/2018 | Merity et al. | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0285739 A1 | 10/2018 | Wu et al. | |
| 2018/0300317 A1 | 10/2018 | Bradbury | |
| 2018/0300400 A1 | 10/2018 | Paulus | |
| 2018/0336198 A1 | 11/2018 | Zhong et al. | |
| 2018/0336453 A1 | 11/2018 | Merity et al. | |
| 2018/0349359 A1 | 12/2018 | Mccann et al. | |
| 2018/0349388 A1 | 12/2018 | Skiles et al. | |
| 2018/0373682 A1 | 12/2018 | Mccann et al. | |
| 2018/0373987 A1 | 12/2018 | Zhang et al. | |
| 2019/0019061 A1 * | 1/2019 | Trenholm | G06K 9/6218 |
| 2019/0041811 A1 | 2/2019 | Drees | |
| 2019/0050640 A1 * | 2/2019 | Sarkar | G06V 30/19147 |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0180147 A1 | 6/2019 | Zhang et al. | |
| 2019/0188568 A1 | 6/2019 | Keskar et al. | |
| 2019/0244113 A1 * | 8/2019 | Ramos | G06N 3/08 |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0278880 A1 | 9/2019 | Ma et al. | |
| 2019/0286073 A1 | 9/2019 | Hosseini-Asl et al. | |
| 2019/0295530 A1 | 9/2019 | Hosseini-Asl et al. | |
| 2020/0099530 A1 | 3/2020 | Khatib et al. | |

OTHER PUBLICATIONS

Akata et al., "Evaluation of Output Embeddings For Fine-Grained Image Classification," In IEEE Conference on Computer Vision and Pattern Recognition, Boston, Massachusetts, USA. Jun. 8-10, 2015. pp. 2927-2936.

Akata et al., "Multi-Cue Zero-Shot Learning with Strong Supervision," In IEEE Conference on Computer Vision and Pattern Recognition, Las Vegas, Nevada, USA. Jun. 26-Jul. 1, 2016, pp. 59-68.

Ba et al., "Predicting Deep Zero-Shot Convolutional Neural Networks Using Textual Descriptions," In International Conference on Computer Vision Santiago, Chile, Dec. 13-16, 2015. pp. 4247-4255, 2015.

Berg et al., "Automatic Attribute Discovery and Characterization From Noisy Web Data," In European Conference on Computer Vision, Crete, Greece. Sep. 5-11, 2010. 14 pages.

Changpinyo et al., "Synthesized Classifiers for Zero-Shot Learning," In Proceedings of the IEEE Conference on Computer Vision and Pattern Recognition, Las Vegas, Nevada, USA, Jun. 26-Jul. 1, 2016, pp. 5327-5336.

Elhoseiny et al., "Write a Classifier: Zero-Shot Learning Using Purely Textual Descriptions," In Proceedings of the IEEE Conference on Computer Vision and Pattern Recognition, Sydney, Australia, Dec. 3-6, 2013, pp. 2584-2591.

Elhoseiny et al., "Write a Classifier: Predicting Visual Classifiers from Unstructured Text," in IEEE Transactions on Pattern Analysis & Machine Intelligence, vol. 39, No. 12, Dec. 2017, pp. 2539-2553.

Farhadi et al., "Describing Objects by Their Attributes," In Proceedings of the IEEE Conference on Computer Vision and Pattern Recognition, Miami Beach, Florida, USA, 2009. pp. 1778-1785.

Finn et al., "Model-Agnostic Meta-Learning for Fast Adaptation of Deep Networks," Proceedings of the 34th International Conference on Machine Learning, Sydney, Australia, Aug. 6-11, 2017, pp. 1126-1135. (URL http://proceedings.mlr.press/v70/finn17a.html).

Frome et al., "Devise: A Deep Visual-Semantic Embedding Model," In Advances in neural information processing systems 26, Lake Tahoe, California, USA, Dec. 5-10, 2013, pp. 2121-2129.

Fu, et al., "Transductive Multi-View Embedding for Zero-Shot Recognition and Annotation," In 13th European Conference on Computer Vision, Zurich, Switzerland, Sep. 6-12, 2014, 16 pages. (http://citeseerx.ist.psu.edu/viewdoc/download?doi=10.1.1.662.672 &rep=rep1&type=pdf).

Fu et al., "Zero-Shot Object Recognition by Semantic Manifold Distance," In Proceedings of the IEEE Conference on Computer Vision and Pattern Recognition, Boston, Massachusetts, Jun. 8-10, 2015, pp. 2635-2644.

Guo et al., "Synthesizing Samples for Zero-Shot Learning," Proceedings of the Twenty-Sixth International Joint Conference on Artificial Intelligence, Melbourne, Australia, Aug. 19-25, 2017, pp. 1774-1780.

Guo et al., "Zero-shot learning with transferred samples," IEEE Transactions on Image Processing, vol. 26, Issue 7, Jul. 2017, 14 pages.

(56) References Cited

OTHER PUBLICATIONS

Lampert et al., "Learning to Detect Unseen Object Classes by Between-Class Attribute Transfer," In Computer Vision and Pattern Recognition, Miami, Florida, USA, Jun. 20-25, 2009. pp. 951-958.

Long et al., "From Zero-Shot Learning to Conventional Supervised Classification: Unseen Visual Data Synthesis," In Proceedings of the IEEE Conference on Computer Vision and Pattern Recognition, Honolulu, Hawaii, USA, Jul. 21-26, 2017. pp. 1627-1636.

Elhoseiny et al., "Link the Head to the "Beak": Zero Shot Learning from Noisy Text Description at Part Precision," In Proceedings of the IEEE Conference on Computer Vision and Pattern Recognition, Honolulu, Hawaii, USA, Jul. 21-26, 2017. pp. 5640-5649.

Oquab et al., "Learning and Transferring Mid-Level Image Representations Using Convolutional Neural Networks," In IEEE Conference on Computer Vision and Pattern Recognition, Columbus, Ohio, USA, Jun. 23-28, 2014, 8 pages.

Palatucci et al., "Zero-Shot Learning with Semantic Output Codes," In 23rd Annual Conference on Neural Information Processing Systems 22, Vancouver, Canada, Dec. 7-10, 2009, 9 pages.

Qiao et al., "Less Is More: Zero-Shot Learning from Online Textual Documents with Noise Suppression," In Proceedings of the IEEE Conference on Computer Vision and Pattern Recognition, Las Vegas, NV, USA, Jun. 27-30, 2016, pp. 2249-2257.

Ravi et al., "Optimization as a Model for Few-Shot Learning," In International Conference on Learning Representations, Toulon, France, Apr. 24-26, 2017. 11 pages.

Rohrbach et al., "Transfer Learning in a Transductive Setting," In 27th Annual Conference on Neural Information Processing Systems 26, Lake Tahoe, Nevada, USA, Dec. 5-8, 2013, pp. 46-54.

Romera-Paredes et al., "An Embarrassingly Simple Approach to Zero-Shot Learning," In Proceedings of the 32nd International Conference on Machine Learning, Lille, France, Jul. 6-11, 2015, 10 pages.

Snell et al., "Prototypical Networks for Few-Shot Learning," In 31st Annual Conference on Neural Information Processing Systems 30, Dec. 4-9, 2017, Long Beach, CA, USA, 2017.

Socher et al., "Zero-Shot Learning Through Cross-Modal Transfer," In 27th Annual Conference On Neural Information Processing Systems, Lake Tahoe, Nevada, USA, Dec. 5-8, 2013, 10 pages.

Van Horn et al., "Building A Bird Recognition App and Large Scale Dataset With Citizen Scientists: The Fine Print In Fine-Grained Dataset Collection," In Proceedings of the IEEE Conference on Computer Vision and Pattern Recognition, Boston, Massachusetts, Jun. 7-12, 2015, pp. 595-604.

Wah et al., "The Caltech-UCSD Birds-200-2011 Dataset," Computation & Neural Systems Technical Report, CNS-TR. California Institute of Technology, Pasadena, CA. 2011, 8 pages.

Zhu et al., "A Generative Adversarial Approach for Zero-Shot Learning From Noisy Texts," In IEEE Conference on Computer Vision and Pattern Recognition, Salt Lake City, Utah, USA, Jun. 18-22, 2018, pp. 1004-1013.

\* cited by examiner

| METHOD | CUB | | NAB | |
| --- | --- | --- | --- | --- |
| | SCS | SCE | SCS | SCE |
| MCZSL | 34.7 | - | - | - |
| WAC-Linear | 27.0 | 5.0 | - | - |
| WAC-Kernel | 33.5 | 7.7 | 11.4 | 6.0 |
| ESZSL | 28.5 | 7.4 | 24.3 | 6.3 |
| SJE | 29.9 | - | - | - |
| ZSLNS | 29.1 | 7.3 | 24.5 | 6.8 |
| SynC$_{fast}$ | 28.0 | 8.6 | 18.4 | 3.8 |
| SynC$_{OVO}$ | 12.5 | 5.9 | - | - |
| ZSLPP | 37.2 | 9.7 | 30.3 | 8.1 |
| GAZSL | 43.7 | 10.3 | 35.6 | 8.6 |
| Correction Networks | 45.8 | 10.0 | 37.0 | 9.5 |

FIG. 6

| METHOD | CUB | |
| --- | --- | --- |
| | SCS | SCE |
| ESZSL | 18.5 | 4.5 |
| ZSLNS | 14.7 | 4.4 |
| WAC$_{kernel}$ | 22.5 | 5.4 |
| WAC$_{linear}$ | 23.9 | 4.9 |
| SynC$_{Fast}$ | 13.1 | 4.0 |
| SynC$_{OVO}$ | 1.7 | 1.0 |
| ZSLPP | 30.4 | 6.1 |
| GAZSL | 35.4 | 8.7 |
| CorrectionNet | 41.9 | 9.0 |

FIG. 7

| METHOD | CUB |
| --- | --- |
| Prediction module only | 43.8 |
| Correction module without class label encodings | 43.4 |
| Prediction and correction module | 45.8 |

FIG. 8

PREDICTION-CORRECTION APPROACH TO ZERO SHOT LEARNING

RELATED APPLICATIONS

The present application is a continuation of U.S. patent application Ser. No. 16/176,075 filed Oct. 31, 2018, which claims priority to U.S. Provisional Patent Application No. 62/737,805, filed Sep. 27, 2018, entitled "Prediction-Correction Approach to Zero Shot Learning," which is hereby incorporated by reference in its entirety.

TECHNICAL FIELD

The present disclosure relates generally to classification and more specifically to using a prediction-correction approach to provide zero shot learning to a classifier.

BACKGROUND

Classifiers are often used in intelligent systems to receive an example input, such as an image, analyze the input, and then classify the input into one of a predetermined number of classes. A common approach in classifier development is to supply a set of training data that includes examples of input from each of the classes and a ground truth classification for each of the input examples. The training data is then presented to a deep learning system, such as a neural network, and the deep learning system is trained to recognize the classes by correcting its classification, such as using the stochastic gradient descent learning algorithm and/or back propagation.

Classifiers developed in this way typically generalize poorly because, even though they are able to fairly accurately classify to the trained classes, they are not able to classify to a new class. Additional classes can be added to the classifier, but this generally requires the deep learning system to be retrained in order to recognize the additional classes. In other words, the deep learning system is not able to extrapolate from its initial training without undergoing further training.

Accordingly, it would be advantageous to have classifiers for which it is possible to add new classes without having to retrain the classifier.

BRIEF DESCRIPTION OF THE DRAWINGS

FIG. 6 is a simplified diagram of classification accuracy against data from new classes according to some embodiments.

FIG. 7 is a simplified diagram of classification accuracy against data from both trained and new classes according to some embodiments.

FIG. 8 is a simplified diagram of the impact of various factors on classification accuracy according to some embodiments.

Figure 1:
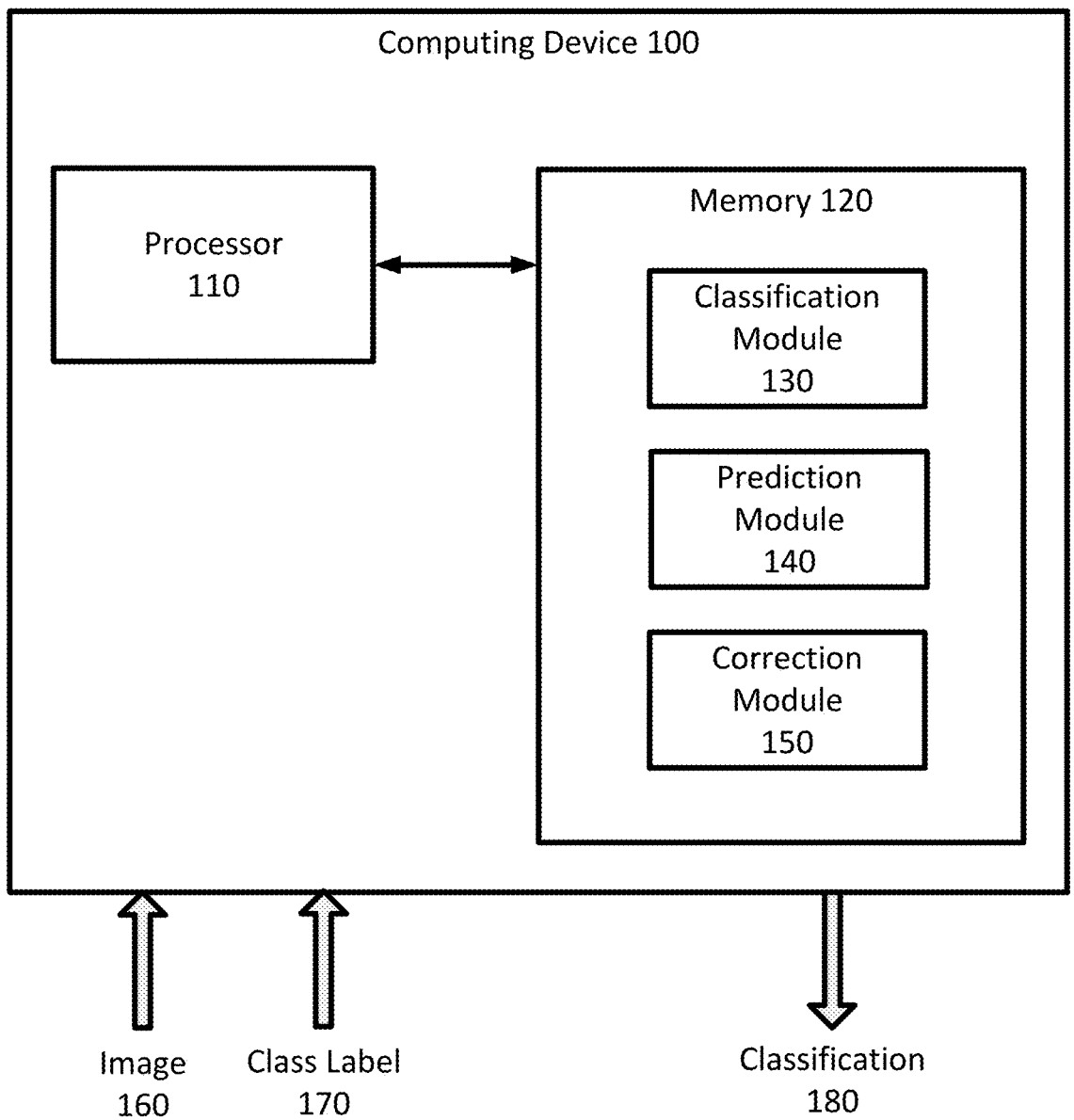
FIG. 1 is a simplified diagram of a computing device according to some embodiments.

In the figures, elements having the same designations have the same or similar functions.

DETAILED DESCRIPTION

Image classifiers are classifiers that are designed to receive an image, analyze the content of the image, and then classify the content of the image into one of a predefined set of classes. A common approach to image classifiers is to use a deep learning system based classifier that is trained by showing the classifier a large number of training images for which the correct (e.g., ground truth) classification is known and providing feedback (e.g., via a stochastic gradient descent algorithm using back propagation) during the training. Once the classifier is trained, it is generally able to correctly classify new images from the trained class. In some embodiments, the classifier works by extracting relevant features from each image and maps them to a feature vector space where images from the same class generally cluster around a same region in the feature vector space that may be defined by a cluster center based on an aggregation of the feature vectors for each of the training samples. When an image is presented to the classifier, it analyzes the image and generates a feature vector, which may be classified into the class whose cluster center is closest to the feature vector.

However, the classifier is generally poor at correctly classifying the images from an untrained class as it does not generalize well because it has not been trained to extrapolate from its training to identify the new class (e.g., because it has not learned a corresponding cluster center for the new class). Often, the classifier is only able to indicate that an image from the new class does not match any of the trained classes (e.g., because its feature vector is farther than a threshold distance from any of the learned cluster centers). The new class can be added to the classifier, but this generally requires that the classifier be retrained using training data that includes a number of training samples from the new class.

According to some embodiments, use of class descriptions (e.g., class labels) to describe classes in addition to image samples in the training data provides for a more robust classifier as the classifier can be trained to recognize images from the trained classes based on observations that the images match the features described in the class descriptions. In addition, describing classes with descriptions also supports zero-shot learning (e.g., learning without express training) as it is much easier to extrapolate a new class based on a description of the new class rather than in the isolation of a new image from the new class.

Natural language is a natural and intuitive medium for humans to convey information that describes a class. Natural language is particularly useful for people with little machine learning background to share knowledge. For example, in fine-grained classification of bird species, bird experts are able to use their knowledge to select what are considered different species, why similar birds are considered different species and to articulate this knowledge via a natural language-based description that others are able to use to recognize a new species without first having to be trained based on images of the new species. In addition, by using natural language as an input format, the bird expert, as an example, does not need prerequisite machine learning knowledge in order to augment an existing bird classification system. Additionally, defining classes using descriptions mimics how humans teach and learn to differentiate between fine-grained classes and acquire domain knowledge.

According to some embodiments, one approach that takes advantage of class descriptions is to train a deep learning prediction module that is able to receive a new class description and predict a new cluster center for that new class. The new cluster center can then be added to the set of cluster centers used by the classifier to give the classifier the ability to classify images from the new class as belonging to the new class. However, the prediction module may suffer from the same types of limited ability to generalize and/or extrapolate from the class descriptions used during training.

According to some embodiments, a prediction-correction approach to determining the cluster center for the new class is likely to be more robust at extrapolating to determine the new cluster center. The prediction-correction approach works by partitioning the training data into a set of prediction classes used to train the prediction module and a separate set of correction classes used to train the correction module. Because the correction module is trained to extrapolate to the set of correction classes, which are separate from the set of prediction classes used to train the prediction module, the correction module is able to provide a better prediction as to the correct cluster center when an entirely new class description is provided. In some examples, the correction module is able to recognize differences between class descriptions and is thus able to provide a corresponding correction to a prediction for the new class made by the prediction module that is based on how significant those differences are.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a classification module 130, a prediction module 140, and a correction module 150 that may be used to implement and/or emulate the prediction-correction based zero shot learning for classification systems and models described further herein and/or to implement any of the methods described further herein. In some examples, classification module 130 may be used to receive an image 160 and to classify image 160 into one of a known set of classes and to provide the results as a classification 180 as is described in further detail below. In some examples, prediction module 140 and correction module 150 may be used to receive a class label 170 (e.g., a description) of a new class that may be used to provide classification module 130 with the ability to classify images 160 into that new class without having to be trained based on images from the new class as is described in further detail below. In some examples, one or more of classification module 130, prediction module 140, and/or correction module 150 may be trained based on training samples that include a set of images 160, class labels 170, and ground truth classifications for each of the training samples as is described in further detail below. In some examples, prediction module 140 and correction module 150 may be collectively referred to as a correction network. In some examples, prediction module 140 may be considered a task module because it is task specific in that it is used to convert class labels 170 into a form usable by classification module 130. In some examples, correction module 150 may be considered a metadata module as it performs the meta task of making correction to a prediction made by a task module (e.g., prediction module 140).

In some examples, one or more of classification module 130, prediction module 140, and/or correction module 150 may include a single- or multi-layer neural network, where each layer of the neural network implements is activated according to Equation 1, where a is the output, x is the input to the neural network layer, W is a set of trainable weights, b is a set of trainable biases, and f is an activation function, such as identity, logistic, tan h, arctan, softsign, rectified linear unit, leaky rectified linear unit, and/or the like. And although classification module 130, prediction module 140, and correction module 150 are depicted as a software modules, classification module 130, prediction module 140, and correction module 150 may be implemented using hardware, software, and/or a combination of hardware and software.

$$a = f(Wx + b) \qquad \text{Equation 1}$$

Figure 2:
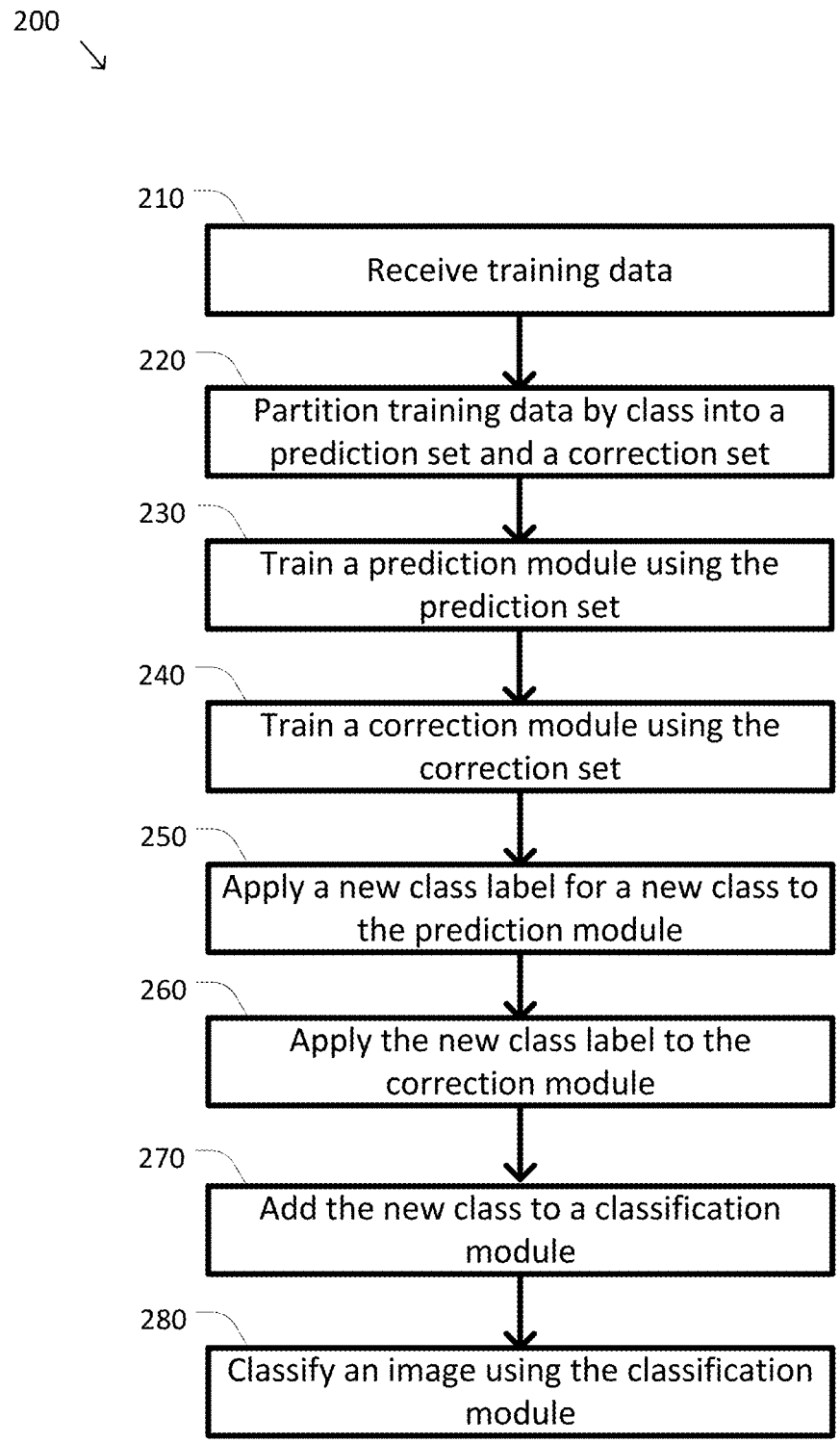
FIG. 2 is a simplified diagram of a method for zero shot learning using a prediction-correction approach according to some embodiments.

FIG. 2 is a simplified diagram of a method 200 for zero shot learning using a prediction-correction approach according to some embodiments. One or more of the processes 210-280 of method 200 may be implemented, at least in part, in the form of executable code stored on non-transitory, tangible, machine-readable media that when run by one or more processors may cause the one or more processors to perform one or more of the processes 210-280. In some embodiments, method 200 may be used to augment a classifier (e.g., classification module 130) to classify exemplars from a new class for which the classifier has not been previously trained. In some examples, method 200 may use a prediction module (e.g., prediction module 140) and a correction module (e.g., correction module 150) to provide a corrected prediction of a cluster center for the new class that is usable by the prediction module to classify the exemplars for the new class.

Figure 3A:
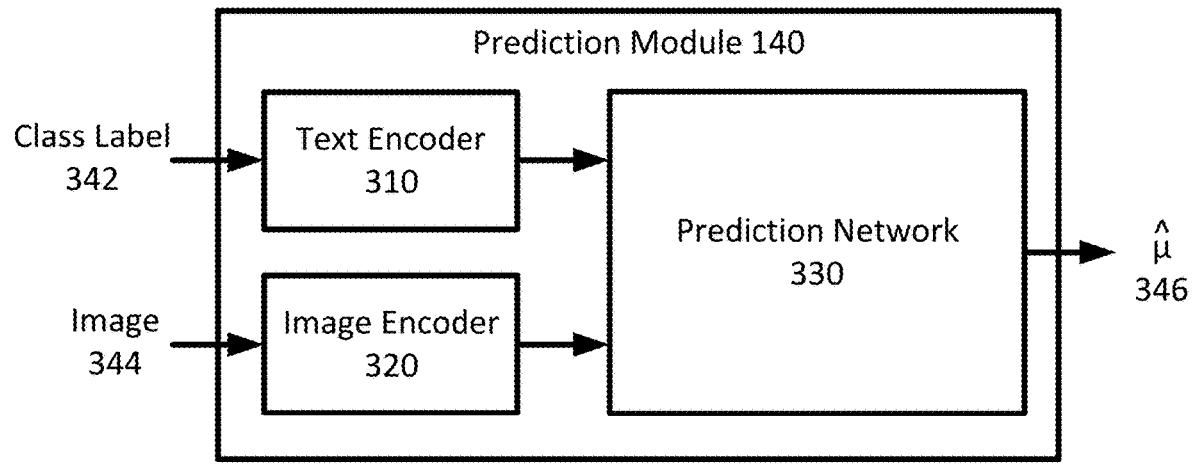
FIG. 3A is a simplified diagram of a prediction module during training according to some embodiments.
Figure 3B:
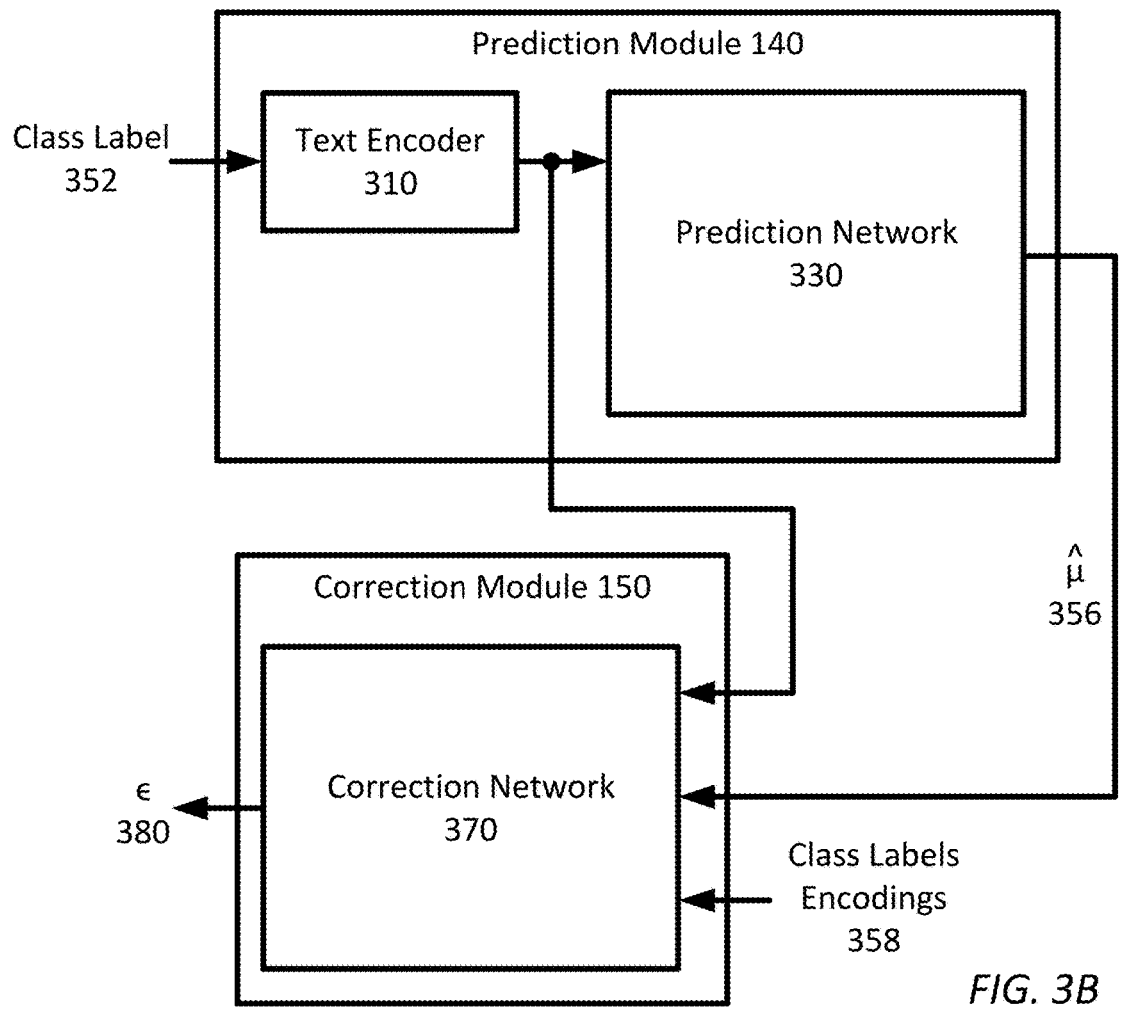
FIG. 3B is a simplified diagram of a correction module during training according to some embodiments.
Figure 4:
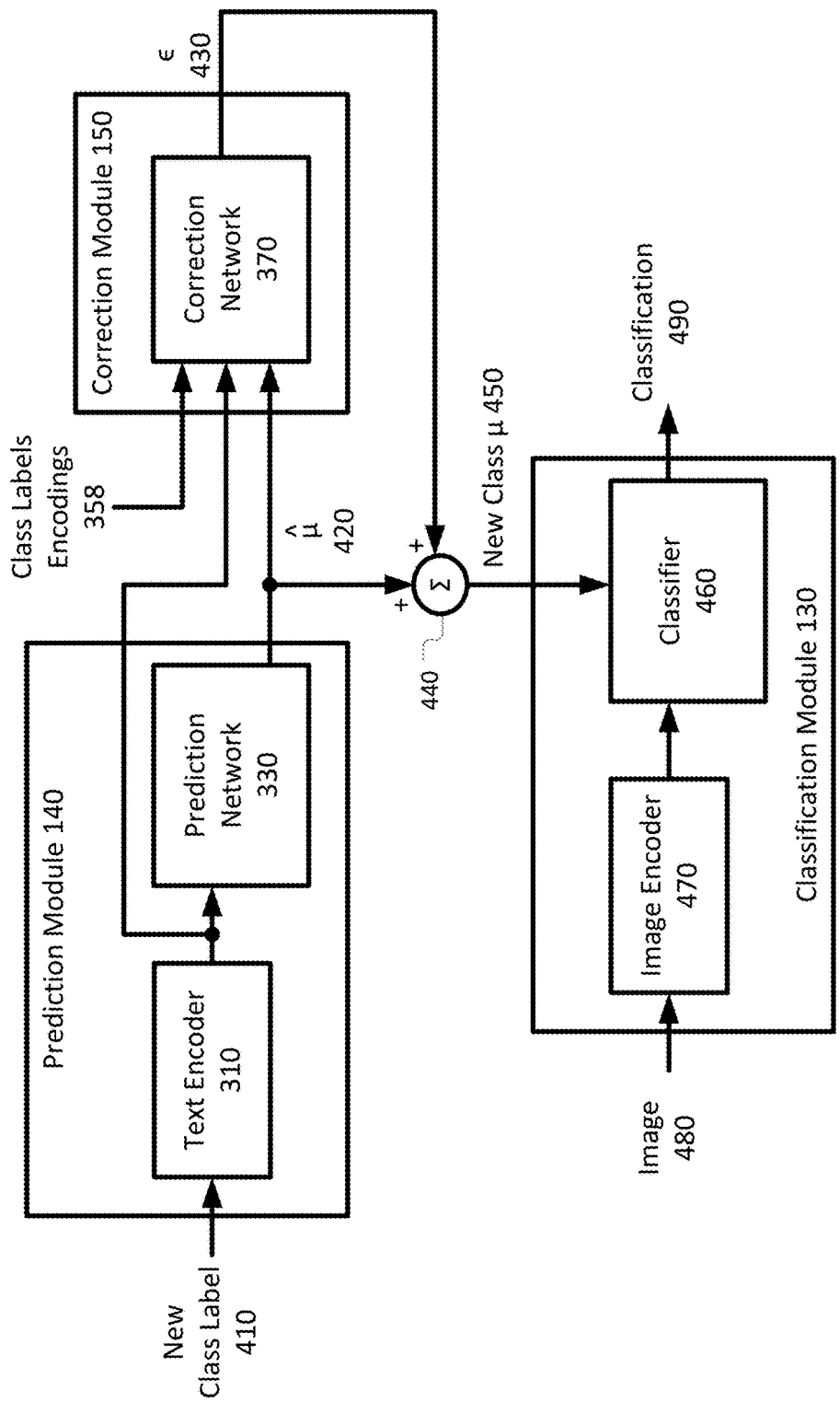
FIG. 4 is a simplified diagram of a classification system during use according to some embodiments.

Method 200 is described below in reference to the examples of embodiments for implementing classification module 130, prediction module 140, and correction module 150 as shown in FIGS. 3A, 3B, and 4. However, it is understood that the embodiments of FIGS. 3A, 3B, and 4 are exemplary only and other structures and/or arrangements of the modules are possible for use with method 200.

Figure 5:
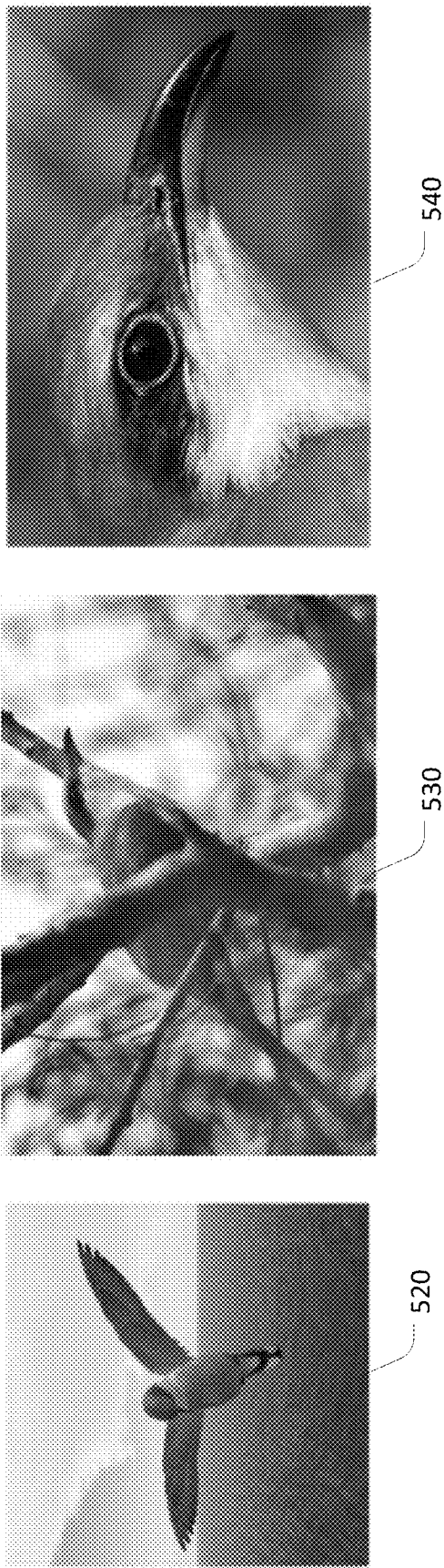
FIG. 5 is a simplified diagram of training data for a class according to some embodiments.

At a process 210, training data is received. In some examples, the training data includes training samples for a plurality of previously recognized classes, which are sometimes referred to as the "seen" classes. Each of the training samples include an image (e.g., image 160) to be classified, a class label (e.g., class label 170) describing the class to which the image belongs, and a ground truth classification for the image. Each of the class labels in the training sample for a particular class is the same. In some examples, the class label may be the same as the ground truth classification. FIG. 5 is a simplified diagram of training data for a class according to some embodiments. Class label 510 shows a class label for the class of birds "Mangrove Cuckoo." As shown, class label 510 is a natural language description of mangrove cuckoos and includes descriptive text that may be visually apparent in an image such as "a long tail," "brown above," "black-and-white below," "black curved bill", etc. FIG. 5 further shows three examples of training images 520, 530, and 540 of the mangrove cuckoo. As further shown in FIG. 5, individual training images (and images used after training), such as training images 520, 530, and/or 540, may not include visual examples of each of the visual features included in the textual description of class label 510. Thus, the examples of FIG. 5 depict three training samples for the class mangrove cuckoo: class label 510, image 520, and ground truth class mangrove cuckoo; class label 510, image 530, and ground truth class mangrove cuckoo; and class label 510, image 540, and ground truth class mangrove cuckoo. In some examples, the training data may be obtained from one or more training datasets, such as the Caltech UCSD Birds 2011 (CUB) dataset, the North America Birds (NAB), dataset, and/or the like. The CUB dataset is described in further detail in C. Wah, et al., "The Caltech-UCSD Birds-200-2011 Dataset. Technical Report CNS-TR-2011-001," California Institute of Technology, 2011, which is incorporated by reference. The NAB dataset is described in further detail in G. Van Horn, et al., "Building a Bird Recognition App and Large Scale Dataset with Citizen Scientists: The Fine Print in Fine-grained Dataset Collection," Proceedings of the IEEE Conference on Computer Vision and Pattern Recognition, pp. 595-604, 2015, which is incorporated by reference.

Referring back to FIG. 2, at a process 220, the training data is partitioned by class. The partitioning separates the training data receiving during process 210 into two disjoint sets. A first or prediction set includes the training samples for a first subset of the classes from the training data that will be subsequently used to train the prediction module. A second or correction set includes the training samples for each of the classes not included in the first subset of classes (e.g., the training data for the classes not used to train the prediction module). For example, if the training data includes training data for M+N classes, the training data for M of the classes form the prediction set and the training data for N of the classes form the correction set, where none of the M classes are the same as any of the N classes. In some examples, the number M corresponds to between 40 and 90 percent of the total M+N classes from the training data received during process 210.

At a process 230, the prediction module (e.g., prediction module 140) is trained using the prediction set. The training of process 230 is described with respect to prediction module 140 as shown in FIG. 3A, which is a simplified diagram of prediction module 140 during training according to some embodiments. More specifically, prediction module 140 includes a text encoder 310, an image encoder 320, and a prediction network 330.

As shown, text encoder 310 receives a class label 342 for the current sample and encodes class label 342 into a natural language feature vector capturing the semantics of class label 342. In some examples, text encoder 310 may encode each of the words in class label 342 using the GloVe encodings where each word is encoded as an element of $\mathbb{R}^{300}$. In some examples, text encoder 310 may encode each of the words using the character n-gram encodings where each word is encoded as an element of $\mathbb{R}^{100}$. In some examples, the encoding of each word is based on a concatenation of GloVe and character n-gram encodings. In some examples, when there is no GloVe and/or character n-gram encoding for a word (e.g., the word is not in English), a random encoding is selected from a Normal distribution having a mean and standard deviation that is the same as the GloVe encodings (e.g., mean of zero and standard deviation of 0.4), with the same random encoding used consistently for each occurrence of the respective word. In some examples, when there is no GloVe and/or character n-gram encoding for a word (e.g., the word is not in English) a value of zero is used. In some examples, the text encoding may include using a term frequency-inverse document frequency (TF-IDF) approach where the words are reduced to their stem words and then tokenized before the TF-IDF is calculated. Use of TF-IDF for text encoding is described in further detail in Zhu, et al., "A Generative Adversarial Approach for Zero-shot Learning from Noisy Texts," IEEE Conference on Computer Vision and Pattern Recognition, 2018, which is incorporated by reference.

As further shown, image encoder 320 receives an image 344 and encodes image 344 into an image feature vector capturing characteristic features of image 344, such as colors, shapes, relative sizes, and/or the like. In some examples, image encoder 320 may be based on a residual network architecture, which are described in more detail in He, et al., "Deep Residual Learning for Image Recognition," IEEE Conference on Computer Vision and Pattern Recognition, 2016, which is incorporated by reference herein. In some examples, image encoder 320 may be built around a computer vision library, such as the Open Source Computer Vision Library. In some examples, image encoder 320 is optional and may be omitted when the image feature vectors for each of the images are included in the training data received during process 210.

Prediction network 330 receives the natural language feature vector from text encoder 310 and the image feature vector from image encoder 320 and predicts a cluster center $\hat{\mu}$ 346 for the class to which class label 342 and image 344 belongs. In some examples, prediction network 330 may include a single- or multi-layer neural network, where each layer of the neural network implements is activated according to Equation 1.

In some examples, prediction network 330 may be trained by repeatedly presenting each of the training samples in the prediction set until prediction network 330 converges to an acceptable error, a threshold number of training samples are presented, a threshold number of training epochs occur, and/or the like. In some examples, prediction network 330 may be trained with unsupervised learning where the cluster centers for each of the classes represented in the prediction set are learned without comparing the predicted cluster centers $\hat{\mu}$ 346 against the ground truth cluster centers for each of the classes, such as by using a self-organizing feature map approach. In some examples, prediction network 330 may be trained with supervised learning by comparing the predicted cluster centers $\hat{\mu}$ 346 against the ground truth cluster centers for each of the classes, such as by using the stochastic gradient descent training algorithm and back propagation. In some examples, the loss function may be based on the distance between each predicted cluster center $\hat{\mu}$ 346 and the corresponding ground truth cluster center for that class as shown in Equation 2, where d indicates the Euclidean or L2 norm distance between a predicted cluster center $\hat{\mu}$ 346 and a corresponding ground truth cluster center $\mu$ and E is the expected value across all the training samples. In some examples, the loss function may further include a sparsity regularization term as shown in Equation 3, where $\alpha$ is a coefficient of regularization and W represents the weights for the various neurons in the prediction module, and $\| \|^2$ is the L2 norm. In some examples, the sparsity regularization term may be used to keep the values of the weights low, which helps address overfitting during the training. In some examples, $\alpha$ may be selected in the range from $10^{-4}$ to $10^{-2}$. In some examples, the training may further use dropout to avoid overfitting.

$$L_{predict} = E[d(\hat{\mu}, \mu)] \quad \text{Equation 2}$$

$$L_{predict} = E[d(\hat{\mu}, \mu)] + \alpha \|W\|^2 \quad \text{Equation 3}$$

Referring back to FIG. 2, at a process 240, the correction module (e.g., correction module 150) is trained using the correction set. The training of process 240 is described with respect to prediction module 140 and correction module 150 as shown in FIG. 3B, which is a simplified diagram of correction module 150 during training according to some embodiments. More specifically, correction module 150 includes a correction network 370.

As shown, text encoder 310 of prediction module 140 receives a class label 352 for one of the classes from the training samples in the correction set. Because the classes in the correction set are not included in the prediction set, class label 352 corresponds to a class label that prediction module 140 was not trained against. Class label 352 is encoded into a natural language feature vector that is passed to prediction network 330, which makes a prediction as to the likely cluster center $\hat{\mu}$ 356 for the class corresponding to class label 352 and does so without access to any of the images and image feature vectors corresponding to class label 352. Thus, class label 352 is zero-shot with respect to prediction network 330 during process 240.

Correction network 370 receives the natural language feature vector from text encoder 310, the predicted cluster center $\hat{\mu}$ 356 from prediction network 330, and class labels encodings 358 (e.g., natural language feature vectors as encoded by text encoder 310) corresponding to each of the class labels 342 from the prediction set and used to train prediction module 140 during process 230. Providing the class labels encodings 358 from the prediction set to correction network 370 allows correction network 370 to observe differences between the natural language feature vector for class label 352 and the prediction network class label encodings 358 to determine how semantically different class label 352 is from the class labels used to train prediction module 140. This information is used by correction network 370 to provide a correction $\epsilon$ 380 to the predicted cluster center $\hat{\mu}$ 356 for class label 352. In some examples, the sum of the predicted cluster center $\hat{\mu}$ 356 and correction $\epsilon$ 380 provides an improved prediction for the cluster center for the class corresponding to class label 352. In some examples, correction network 370 may include a single- or multi-layer neural network, where each layer of the neural network implements is activated according to Equation 1.

In some examples, correction network 370 may be trained by repeatedly presenting each of the training samples in the correction set until correction network 370 converges to an acceptable error, a threshold number of training samples are presented, a threshold number of training epochs occur, and/or the like. In some examples, correction network 370 may be trained with supervised learning by comparing the predicted cluster centers $\hat{\mu}$ 356 as corrected by respective corrections $\epsilon$ 380 against the ground truth cluster centers for each of the classes corresponding to the class labels 352 in the correction set, such as by using the stochastic gradient descent training algorithm and back propagation. In some examples, the loss function may be based on the distance between each predicted cluster center $\hat{\mu}$ 356 as corrected by correction $\epsilon$ 380 and the corresponding ground truth cluster center for that class as shown in Equation 4, where d indicates the Euclidean or L2 norm distance between a correction $\epsilon$ 380 and the differences between a predicted cluster center $\hat{\mu}$ 346 and a corresponding ground truth cluster center $\mu$ and E is the expected value across all the training samples. In some examples, the training may further use dropout to avoid overfitting.

$$L_{correct} = E[d(\epsilon, \mu - \hat{\mu})] \quad \text{Equation 4}$$

Referring back to FIG. 2, at a process 250, a class label for a new class is applied to the prediction module. The application of process 250 is described with respect to prediction module 140 as shown in FIG. 4, which is a simplified diagram of classification system during use according to some embodiments.

As shown, text encoder 310 of prediction module 140 receives a new class label 410 for a class that is not represented in either the classes from training samples from the prediction set or the training samples from the correction set. Thus, new class label 410 is zero-shot for prediction module 140 because prediction module 140 has never previously seen new class label 410. New class label 410 is encoded into a natural language feature vector that is passed to prediction network 330, which makes a prediction as to the likely cluster center $\hat{\mu}$ 420 for the class corresponding to new class label 410 and does so without access to any of the images and image feature vectors corresponding to new class label 410 because no such training images have to be available.

Referring back to FIG. 2, at a process 260, the new class label is applied to the correction module. As shown in FIG. 4, correction network 370 of correction module 150 receives the predicted cluster center $\hat{\mu}$ 420 for the class corresponding to new class label 410, the natural language feature vector from text encoder 310 corresponding to new class label 410, and class labels encodings used to train prediction network 330. Because new class label 410 corresponds to a class that is not represented in either the classes from training samples from the prediction set or the training samples from the correction set, new class label 410 is zero-shot for correction module 150 because correction module 150 has never previously seen new class label 410. Correction network 370 then generates a correction $\epsilon$ 380 to the predicted cluster center $\hat{\mu}$ 420. Correction $\epsilon$ 380 and the predicted cluster center $\hat{\mu}$ 420 are passed to a summing unit 440 (e.g., an adder), which generates a new class cluster center $\mu$ 450.

Referring back to FIG. 2, at a process 270, the new class is added to the classification module (e.g., classification module 130). As further shown in FIG. 4, classification module 130 includes a classifier 460. Classifier receives new class cluster center μ 450 and adds new class cluster center μ 450 to its list of cluster centers for classes classification module 130 is able to classify. In some examples, the list of cluster centers includes cluster centers for each of the other classes that classification module is able to classify. In some examples, the list of cluster centers includes some or all of the cluster centers for the classes in the prediction set and/or the correction set.

Referring back to FIG. 2, at a process 280, an image is classified using the classification module. As further shown in FIG. 4, classification module 130 includes an image encoder 470 in addition to the previously described classifier 460. Similar to image encoder 320, image encoder 470 receives an image 480 and encodes image 480 as an image feature vector. In some examples, image encoder 470 is the same as image encoder 320. The image feature vector is then passed to classifier 460, which predicts a classification result 490 for image 480. In some examples, classifier 460 compares the image feature vector for image 480 to each of the cluster centers in its list of cluster centers and generates classification result 490 as the class whose cluster center is closest to the image feature vector corresponding to image 480. In some examples, classifier 460 may further provide a confidence in classification result 490 based on the distance between the cluster center corresponding to classification result 490 and the image feature vector corresponding to image 480. In some examples, classifier 460 may indicate that there is no classification result when the distance is greater than a threshold. Advantageously, classification module 130 is able to classify image 480 into classes for which it has never previously seen an image, such as the class corresponding to new class label 410 because it has been augmented using process 270.

As discussed above and further emphasized here, FIGS. 2-4 are merely examples which should not unduly limit the scope of the claims. One of ordinary skill in the art would recognize many variations, alternatives, and modifications. According to some embodiments, method 200, classification module 130, prediction module 140, and correction module 150 may be adapted to classification problems other than image classification. In some examples, image encoders 320 and/or 470 may be replaced with encoders for generating feature vectors for a different classification domain.

According to some embodiments, method 200 may be modified to increase the number of training examples that are presented to the correction module during process 240. In some examples, processes 220 and 230 may be repeated multiple times where different partitions are used to generate the prediction and correction sets. For example, if the training data included three classes A, B, and C and the partitioning of process 220 puts two classes in the prediction set and one class in the correction set, training samples for process 240 may be generated by training a first version of the prediction module with classes A and B in the prediction set and class C in the correction set, a second version of the prediction module may be trained with classes A and C in the prediction set and class B in the correction set, and a third version of the prediction module may be trained with classes B and C in the prediction set and class A in the correction set. In some examples, the number of different partitions may be fewer than the full number of possible partitions with the choice of partitions being selected randomly. In some examples, different partitions may partition different numbers of classes into different prediction sets. In some examples, with each of the different partitions, a partition-specific prediction module is trained during process 230 and then the partition-specific module is used in the training of a same correction module during process 240 (e.g., each of the different partitions is used to further train the same correction module trained using the previously trained partitions). In some examples, each of the partition-specific training modules is saved along with its prediction accuracy so that a best one of the partition-specific training modules may be used as the prediction module during process 250.

According to some embodiments, the training of the prediction module during process 230 may be enhanced by factoring in classification error due to the predicted cluster centers $\hat{\mu}$ 346. In some examples, the predicted cluster centers $\hat{\mu}$ 346 may be used to classify the training images (e.g., by using the predicted cluster centers $\hat{\mu}$ 346 with classification module 130) and the classification error may be back propagated to provide additional training for the weights and/or biases of prediction network 330.

The classification accuracy of classification module 130 using the zero shot classes identified by prediction module 140 and correction module 150 in comparison to other zero shot learning approaches is evaluated as described below for data from both the CUB and NAB datasets. To more fully evaluate the accuracy of the class centers provided by prediction module 140 and correction module 150, the CUB and NAB datasets are divided according to two splits that control which classes are "seen" and used to train prediction module 140 and correction module 150 and those classes that are "unseen" during training and used to add new cluster centers to classification module 130 using processes 250-270. A first split uses a super category shared (SCS) strategy where classes from each super category (e.g., wrens, sparrows, etc.) are included in both the "seen" and "unseen" data (e.g., house wren may be in the "seen" data and mountain wren may be in the "unseen" data). A second split used a super category exclusive (SCE) strategy where classes from each super category are include in either the "seen" data or the "unseen" data, but not in both. The SCS and SCE strategies are described in further detail in M. Elhoseiny, et al., "Write a Classifier: Predicting Visual Classifiers from Unstructured Text," IEEE Transactions on Pattern Analysis and Machine Intelligence, 39(12):2539-2553, 2017, which is incorporated by reference.

The other zero shot learning approaches include MCZSL described in Z. Akata, et al., Multi-Cue Zero-Shot Learning with Strong Supervision," Proceedings of the IEEE Conference on Computer Vision and Pattern Recognition, pp. 59-68, 2016; WAC-Linear described in M. Elhoseiny, et al. "Write a Classifier: Zero-Shot Learning using Purely Textual Descriptions," IEEE International Conference on Computer Vision (ICCV), pp. 2584-2591, 2013; WAC-Kernel and ZSLPP described in M. Elhoseiny, et al., "Write a Classifier: Predicting Visual Classifiers from Unstructured Text," IEEE Transactions on Pattern Analysis and Machine Intelligence, 39(12):2539-2553, 2017; ESZSL described in B. Romera-Paredes, et al. "An Embarrassingly Simple Approach to Zero-Shot Learning," International Conference on Machine Learning, pp. 2152-2161, 2015; SJE described in Z. Akata, et al., "Evaluation of Output Embeddings for Fine-grained Image Classification," IEEE Conference on Computer Vision and Pattern Recognition, pp. 2927-2936, 2015; ZSLNS described in R. Qiao, et al., "Less is More: Zero-Shot Learning from Online Textual Documents with Noise Suppression," Proceedings of the IEEE Conference on Computer Vision and Pattern Recognition, pp. 2249-2257, 2016; SynC$_{fast}$ and SynCovo described in S. Changpinyo, et al., "Synthesized Classifiers for Zero-Shot Learning," IEEE Conference on Computer Vision and Pattern Recognition, pp. 5327-5336, 2016; and GAZSL described in Y. Zhu, et al., "A Generative Adversarial Approach for Zero-Shot Learning from Noisy Texts," IEEE Conference on Computer Vision and Pattern Recognition, 2018, each of which is incorporated by reference.

FIG. 6 is a simplified diagram of classification accuracy against data from new classes according to some embodiments. As shown in FIG. 6, the classification accuracy of classification module 130 as updated by new class cluster centers as predicted by prediction module 140 and corrected by correction module 150 using method 200 ("Correction Networks") are shown in comparison against classification accuracies of the other zero shot learning approaches. The classification accuracy is shown for both the CUB and NAB datasets using both the SCS and SCE splits for images drawn from the "unseen" classes (e.g., images for those classes whose cluster centers were added by process 270 and were not included in the training data from processes 230 and 240). The accuracy metric used is the area under the seen-unseen curve (AUSUC), which is a measure of how well each of the trained classifiers minimizes the 0-1 loss function (e.g., did the classification module correctly classify the images). The AUSUC metric is described in W. Chao, et al., "An Empirical Study and Analysis of Generalized Zero-Shot Learning for Object Recognition in the Wild," European Conference on Computer Vision, pp. 52-68, 2016, which is incorporated by reference. As can be seen in FIG. 6, classification module 130 as updated by the correction network of prediction module 140 and correction module 150 outperformed all the other zero shot learning approaches for both the CUB and NAB datasets using both the SCS and SCE splits with the exception of the GAZSL approach on the CUB dataset with the SCE split, which only slightly outperformed classification module 130.

FIG. 7 is a simplified diagram of classification accuracy against data from both trained and new classes according to some embodiments. As shown in FIG. 6, the classification accuracy of classification module 130 as updated by new class cluster centers as predicted by prediction module 140 and corrected by correction module 150 using method 200 ("Correction Net") are shown in comparison against classification accuracies of the other zero shot learning approaches. The classification accuracy is shown for the CUB dataset using both the SCS and SCE splits for images drawn from both the "seen" and the "unseen" classes (e.g., images for those classes whose cluster centers were added by process 270 and images for those classes included in the training data from processes 230 and 240). The accuracy metric used is the AUSUC metric. As can be seen in FIG. 7, classification module 130 as updated by the correction network of prediction module 140 and correction module 150 outperformed all the other zero shot learning approaches for the CUB dataset using both the SCS and SCE splits.

FIG. 8 is a simplified diagram of the impact of various factors on classification accuracy according to some embodiments. FIG. 8 shows that using the correction module to correct the cluster center prediction of the prediction module results in a two point increase in the AUSUC metric relative to using only the prediction module to predict the new cluster center. FIG. 8 also shows that providing the correction module with the class label encodings 358 of the classes used to train the prediction module improves the AUSUC metric by 2.4 points.

Some examples of computing devices, such as computing device 100 may include non-transitory, tangible, machine readable media that include executable code that when run by one or more processors (e.g., processor 110) may cause the one or more processors to perform the processes of method 200 and/or emulate the structures of FIGS. 3A, 3B, and/or 4. Some common forms of machine readable media that may include the processes of method 200 and/or emulate the structures of FIGS. 3A, 3B, and/or 4 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method, comprising:
partitioning training data into a first set and a second set of training data;
    wherein classes for training samples in the first set are not in the second set; and
    wherein classes for training samples in the second set are not in the first set;
training a prediction network based on the training samples in the first set to predict a cluster center;
training a correction network based on the training samples in the second set to generate a correction to the cluster center; and
updating a classifier by adding a new class cluster center for a new class to a list of cluster centers for existing classes of the classifier using the trained prediction network and the trained correction network.

2. The method of claim 1, wherein:
the new class has an entirely new class description.

3. The method of claim 1,
wherein each of class labels of the training samples is a natural language class label.

4. The method of claim 1, wherein the prediction network includes a text encoder.

5. The method of claim 4, wherein the prediction network further includes an image encoder.

6. The method of claim 1, wherein the prediction network includes a neural network; and
wherein training the prediction network comprises using supervised learning based on ground truth cluster centers for each of the classes in the first set.

7. The method of claim 1, wherein the correction network includes a neural network; and
wherein training the correction network comprises using supervised learning based on ground truth cluster centers for each of the classes in the second set.

8. The method of claim 1, wherein the generating the classifier includes:
presenting a first new class label for the new class to the prediction network to predict a first cluster center for the new class;
presenting the first new class label for the new class, the first predicted cluster center, and class labels in the first set to the correction network to generate a first correction for the first predicted cluster center;
generating a corrected cluster center for the new class based on the first predicted cluster center and the first correction; and
augmenting the classifier based on the corrected cluster center for the new class.

9. The method of claim 8, further comprising:
classifying, using the classifier, input data into the new class;
wherein the classifying using the classifier includes:
encoding the input data to form a feature vector; and
comparing a distance between the feature vector and the corrected cluster center for the first new class label.

10. The method of claim 1, further comprising:
partitioning the training data into a third set and a fourth set, wherein classes for training samples in the third set are not in the fourth set and training samples from the fourth set are not in the third set;
training a second prediction network based on the training samples in the third set; and
further training the correction network based on the training samples in the fourth set and class labels in the third set.

11. A system comprising:
a non-transitory memory; and
one or more hardware processors coupled to the non-transitory memory and configured to read instructions from the non-transitory memory to cause the system to perform a method comprising:
training a prediction network based on training data from a first set to predict cluster centers for a first plurality of classes, the first set comprising training samples for the first plurality of classes;
training a correction network based on training data from a second set to generate corrections for the predicted cluster centers respectively, the second set comprising training samples for a second plurality of classes different from the first plurality of classes; and
updating a classifier by adding a new class cluster center for a new class to a list of cluster centers for existing classes of the classifier using the trained prediction network and the trained correction network.

12. The system of claim 11, wherein the new class is not in the first plurality of classes; and wherein the new class is not in the second plurality of classes.

13. The system of claim 11, wherein:
the prediction network includes a neural network; and
the prediction network is further trained using supervised learning based on ground truth cluster centers for each of the first plurality of classes in the first set.

14. The system of claim 11, wherein:
the correction network includes a neural network; and
the correction network is further trained using supervised learning based on ground truth cluster centers for each of the second plurality of classes in the second set.

15. The system of claim 11, wherein the generating the classifier includes:
presenting a first new class label for the new class to the prediction network to predict a first cluster center for the new class;
generating, using the correction network, a first correction for the first predicted cluster center based on the first new class label for the new class, the first predicted cluster center, and each of class labels in the first set;
generating a corrected cluster center for the new class based on the first predicted cluster center and the first correction; and
augmenting the classifier based on the corrected cluster center for the new class.

16. A non-transitory machine-readable medium comprising executable code which when executed by one or more processors associated with a computing device are adapted to cause the one or more processors to perform a method comprising:
partitioning training data into a first set and a second set of training data;
wherein classes for training samples in the first set are not in the second set; and
wherein classes for training samples in the second set are not in the first set;
training a prediction network based on the training samples in the first set to predict a cluster center;
training a correction network based on the training samples in the second set to generate a correction to the cluster center; and
updating a classifier by adding a new class cluster center for a new class to a list of cluster centers for existing classes of the classifier using the trained prediction network and the trained correction network.

17. The non-transitory machine-readable medium of claim 16, wherein:
the new class is different from each class of the training data.

18. The non-transitory machine-readable medium of claim 16, wherein:
the prediction network includes a neural network; and
training the prediction network comprises using supervised learning based on ground truth cluster centers for each of the classes in the first set.

19. The non-transitory machine-readable medium of claim 16, wherein the correction network includes a neural network; and wherein training the correction network comprises using supervised learning based on ground truth cluster centers for each of the classes in the second set.

20. The non-transitory machine-readable medium of claim 16, wherein the generating the classifier includes:
presenting a first new class label for the new class to the prediction network to predict a first cluster center for the new class;
generating a first correction for the first predicted cluster center based on the first new class label for the new class, the first predicted cluster center, and each of class labels in the first set;
generating a corrected cluster center for the new class based on the first predicted cluster center and the first correction; and
augmenting the classifier based on the corrected cluster center for the new class.

* * * * *